United States Patent [19]

Rollmann et al.

[11] 4,139,600

[45] Feb. 13, 1979

[54] SYNTHESIS OF ZEOLITE ZSM-5

[75] Inventors: Louis D. Rollmann, Princeton, N.J.; Ernest W. Valyocsik, Yardley, Pa.

[73] Assignee: Mobil Oil Corporation, New York, N.Y.

[21] Appl. No.: 789,899

[22] Filed: Apr. 22, 1977

[51] Int. Cl.$^2$ .................... C01B 33/28; B01J 29/28
[52] U.S. Cl. .................. 423/329; 252/455 Z; 260/448 C; 423/328
[58] Field of Search .............. 423/328, 329, 330, 118; 260/448 C; 252/455 Z, 431 N

[56] References Cited

U.S. PATENT DOCUMENTS

| | | | |
|---|---|---|---|
| 3,247,195 | 4/1966 | Kerr | 423/329 X |
| 3,702,886 | 11/1972 | Argauer et al. | 423/328 |
| 4,016,245 | 5/1977 | Plank et al. | 423/328 |

OTHER PUBLICATIONS

Breck, "Zeolite molecular sieves," 1974, pp. 304-312.

*Primary Examiner*—Edward J. Meros
*Attorney, Agent, or Firm*—Charles A. Huggett; Raymond W. Barclay

[57] ABSTRACT

As synthesized by conventional technique, zeolite ZSM-5 is crystallized in the presence of substantial amount of tetraalkylammonium cations, the alkyl groups of which contain 2 to 5 carbon atoms, such as, for example, tetrapropylammonium. When synthesized in the conventional way, ZSM-5 contains tetraalkylammonium cations as well as substantial amount of sodium ions. To obtain a more catalytically active form of ZSM-5, the sodium ions must be exchanged to very low levels. By synthesizing zeolite ZSM-5 according to the present method, i.e. in the presence of one or more diamines and with a specifically defined reaction mixture composition, ZSM-5 having different organic nitrogen-containing cations but the same crystal structure as conventionally prepared ZSM-5 is obtained. The ZSM-5 prepared in accordance hereto is very low in sodium content as synthesized.

14 Claims, No Drawings

SYNTHESIS OF ZEOLITE ZSM-5

BACKGROUND OF THE INVENTION

1. Field of the Invention

The present invention relates to a new form of ZSM-5, to a process for preparing it and to a method for using it in organic compound, e.g. hydrocarbon compound, conversion reactions. More particularly, it relates to making and using ZSM-5 which, in its as synthesized form, has different organic nitrogen-containing cations, extremely low sodium content and the same crystal structure as conventionally synthesized ZSM-5.

2. Summary of the Prior Art

Zeolite ZSM-5 is a relatively new zeolite which in its conventionally synthesized aluminosilicate form has the following composition expressed in terms of mole ratios of oxides in the anhydrous state:

$$0.9 \pm 0.2 \, M_{2/n}O : Al_2O_3 : xSiO_2$$

wherein M is selected from the group consisting of a mixture of tetraalkylammonium cations, the alkyl groups of which contain 2–5 carbon atoms, and alkali metal cations, especially sodium and x is at least 5, said cations having the valence n. ZSM-5 has a distinctive X-ray diffraction pattern which further identifies it from other known zeolites. The original alkali metal cations of ZSM-5 can be exchanged by ion exchange with other ions to form species of the zeolite which have exceptional catalytic properties. Zeolite ZSM-5 and its conventional preparation are the subject of U.S. Pat. No. 3,702,886, the disclosure of which is incorporated herein by reference.

SUMMARY OF THE INVENTION

In accordance with the present invention there is provided a new form of ZSM-5 having the following formula in terms of mole ratios of oxides in the anhydrous state:

$$(0.5–10.0)R : (0–0.5)M_2O : Al_2O_3 : xSiO_2$$

wherein M is an alkali metal ion, especially sodium, and R is an alkyldiamine or an organic nitrogen-containing cation derived therefrom and x is at least 5. The present invention also provides a process for preparing the ZSM-5 and a method for using it in organic compound, e.g. hydrocarbon compound, conversion reactions.

DESCRIPTION OF SPECIFIC EMBODIMENTS

Zeolite ZSM-5 has been conventionally prepared by forming a mixture of alumina, silica, alkali metal oxide, water and tetraalkylammonium compounds such that the mixture has a composition, in terms of mole ratios of oxides, falling within the following range:

$SiO_2/Al_2O_3 = 5–100$
$H_2O/SiO_2 = 0.7–3000$
$OH^-/SiO_2 = 0.07–10.0$
$M/SiO_2 = 0.3–3.0$
$R/SiO_2 = 0.01–2.0$ wherein M is an alkali metal ion and R is a tetraalkylammonium cation, the alkyl groups of which contain 2–5 carbon atoms. The reaction mixture is maintained at a temperature of from about 100° F. to about 400° F. until crystals of ZSM-5 are formed.

Zeolite ZSM-5 possesses a definite distinguishing crystalline structure whose X-ray diffraction pattern shows the following significant lines:

TABLE I

| Interplanar Spacing d (Å) | Relative Intensity |
|---|---|
| 11.1 ± 0.3 | S |
| 10.0 ± 0.3 | S |
| 7.4 ± 0.2 | W |
| 7.1 ± 0.2 | W |
| 6.3 ± 0.2 | W |
| 6.04 ± 0.2 | W |
| 5.56 ± 0.1 | W |
| 5.01 ± 0.1 | W |
| 4.60 ± 0.08 | W |
| 4.25 ± 0.08 | W |
| 3.85 ± 0.07 | VS |
| 3.71 ± 0.05 | S |
| 3.04 ± 0.03 | W |
| 2.99 ± 0.02 | W |
| 2.94 ± 0.02 | W |

These values were determined by standard technique. The radiation was the K-alpha doublet of copper, and a scintillation counter spectrometer with a strip chart pen recorder was used. The peak heights, I, and the positions as a function of 2 times theta, where theta is the Bragg angle, were read from the spectrometer chart. From these, the relative intensities, $100I/I_o$, where $I_o$ is the intensity of the strongest line or peak, and d (obs.), the interplanar spacing in Å, corresponding to the recorded lines, were calculated. In Table I the relative intensities are given in terms of the symbols W = weak, S = strong and VS = very strong. It should be understood that this X-ray diffraction pattern is characteristic of all the species of ZSM-5 zeolites. Ion exchange of the sodium ion with cations reveals substantially the same pattern with some minor shifts in interplanar spacing and variation in relative intensity. Other minor variations can occur depending on the silicon to aluminum ratio of the particular sample, as well as if it has been subjected to thermal treatment.

In the present method of preparing a ZSM-5 crystalline aluminosilicate zeolite, a reaction mixture is prepared comprising sources of alkali metal, alumina, silica, organic nitrogen-containing cations, and water. The reaction mixture has the following composition, expressed in terms of mole ratios of oxides:

| | Broad | Preferred | Particularly Preferred |
|---|---|---|---|
| $SiO_2/Al_2O_3 =$ | 5–1000 | 10–500 | 20–100 |
| $H_2O/SiO_2 =$ | 5–200 | 10–100 | 15–60 |
| $OH^-/SiO_2 =$ | $10^{-10}$–1.0 | $10^{-8}$–0.8 | $10^{-6}$–0.6 |
| $M/SiO_2 =$ | 0.01–3.0 | 0.1–2.0 | 0.2–1.0 |
| $R/SiO_2 =$ | 0.01–2.0 | 0.05–1.0 | 0.1–1.0 | wherein M is an alkali metal ion, preferably sodium, and R is alkyldiamine, the alkyl groups of which contain from 2 to 20 carbon atoms, preferably a pentanediamine and/or a hexanediamine. The reaction mixture is maintained at a temperature of from about 100° F. to about 400° F. for a period of time of from about 3 hours to about 180 days until crystals of ZSM-5 are formed. A more preferred temperature range is from about 180° F. to about 350° F. for a period of time at a temperature within such preferred range being from about 3 hours to about 30 days.

It is recalled that in calculating the mole ratio of hydroxide ions/silica, it is conventional to calculate hydroxide by summing moles of $OH^-$, whether added as NaOH, as quaternary ammonium hydroxide (in the case of a conventional preparation), as sodium silicate (NaOH + $SiO_2$), as sodium aluminate (NaOH + $Al_2O_3$), or the like and to subtract from that sum any moles of acid added. Acid may be added simply as HCl, $HNO_3$, $H_2SO_4$, acetic acid, and the like or it may be added as an aluminum sulfate ($Al_2O_3 + H_2SO_4$), chloride ($Al_2O_3$ + HCl), nitrate ($Al_2O_3 + HNO_3$), etc. Each mole of $Al_2O_3$ is itself equivalent to 2 moles of acid in this calculation, since $Al_2O_3$ consumes 2 moles of hydroxide in its conversion to framework aluminate ion. In particular, no contribution is assigned to organic bases such as amines in this calculation. Amines present in reaction mixtures having an $OH^-/SiO_2$ ratio of 0.01 are protonated when further acid is added. Until said additional acid exceeds the amine present, the pH remains above 7.

In a conventional calculation, which does not consider amines, the total moles of acid could thereby exceed the moles of hydroxide initially present in said reaction mixture and subtraction would thereby lead to apparent "negative" $OH^-/SiO_2$ ratios. A negative ratio is, of course, not possible since the true moles of hydroxide (per liter) in an aqueous mixture are always positive and equal to $10^{-14}$ divided by the moles per liter of acid. Calculated from the true moles of hydroxide, the present invention would include an $OH^-/SiO_2$ range of about $10^{-10}$ to about 1.0.

For convenience, and to maintain the conventions established in describing reaction mixture compositions, we define a ratio of $H^+$(additional)/$SiO_2$, which is equal to the moles of $H^+$ added in excess of the moles $OH^-$ added in preparing the reaction mixture.

In the above reaction mixture composition, an optimum range in the $OH^-/SiO_2$ and $R/SiO_2$ ratios exists which is specific to each individual diamine. When larger amounts of diamine are effective, higher $OH^{-\lambda}/SiO_2$ ratios can be used; when the diamine is effective at low $R/SiO_2$ ratio, the optimum $OH^-/SiO_2$ ratio will generally be lower. These trends suggest that it is the protonated diamine which directs crystallization to ZSM-5.

The digestion of the gel particles is carried out until crystals form. The solid product is separated from the reaction medium, as by cooling the whole to room temperature, filtering and water washing.

In addition to providing a low-sodium ZSM-5 which can be used as a catalyst without intermediate exchange, it is interesting to note that the present method of preparation of ZSM-5 also provides the benefit of being lower cost than conventional preparation technique since the template materials for use herein are substantially lower cost than the conventional template materials. One particularly effective diamine, i.e. 1,6-hexanediamine, is a large scale commercial intermediate in the production of nylon polymers. The zeolite product, therefore, is also of lower cost than conventionally prepared ZSM-5.

The composition for the synthesis of synthetic ZSM-5 can be prepared utilizing materials which can supply the appropriate oxide. Such materials include aluminates, alumina, silicates, silica hydrosol, silica gel, silicic acid and hydroxides. It will be understood that each oxide component utilized in the reaction mixture for preparing ZSM-5 can be supplied by one or more essential reactants and they can be mixed together in any order. For example, any oxide can be supplied by an aqueous solution, sodium hydroxide or by an aqueous solution of a suitable silicate; the organic nitrogen-containing cation can be supplied by a compound of that cation, such as, for example, a salt, as well as by the indicated diamine. The reaction mixture can be prepared either batchwise or continuously. Crystal size and crystallization time of the ZSM-5 composition will vary with the nature of the reaction mixture employed.

The ZSM-5 composition as prepared hereby has the characteristic X-ray diffraction pattern of conventionally prepared ZSM-5, the values of which are set forth in Table I.

Even though the presently prepared ZSM-5 has an extremely low amount of alkali metal, e.g. sodium, ions, as synthesized, and therefore can be utilized as catalytic material for a number of hydrocarbon conversion reactions substantially as synthesized, the original cations of the as synthesized ZSM-5 can be replaced in accordance with techniques well known in the art, at least in part, by ion exchange with other cations. Preferred replacing cations include metal ions, ammonium ions, hydrogen ions and mixtures thereof. Particularly preferred cations are those which render the zeolite catalytically active especially for hydrocarbon conversion. These include hydrogen, rare earth metals, aluminum, metals of Groups IIA, IIIB, IVB, VIB, VIII, IB, IIB, IIIA, IVA. Of the replacing metallic cations, particular preference is given to cations of metals such as rare earth, Mn, Ca, Mg, Zn, Cd, Pd, Ni, Co, Ti, Al, Sn, Fe and Cu.

A typical ion exchange technique would be to contact the synthetic ZSM-5 zeolite with a salt of the desired replacing cation or cations. Although a wide variety of salts can be employed, particular preference is given to chlorides, nitrates and sulfates.

Representative ion exchange techniques are disclosed in a wide variety of patents including U.S. Pat. Nos. 3,140,249; 3,140,251; and 3,140,253.

Following contact with the salt solution of the desired replacing cation, the zeolite is then preferably washed with water and dried at a temperature ranging from 150° F. to about 600° F. and thereafter may be calcined in air or other inert gas at temperatures ranging from about 500° F. to 1500° F. for periods of time ranging from 1 to 48 hours or more to produce a catalytically-active thermal decomposition product thereof.

Regardless of the cation replacing the cations in the synthesized form of the ZSM-5, the spatial arrangement of the aluminum, silicon and oxygen atoms which form the basic crystal lattices of ZSM-5 remains essentially unchanged by the described replacement of the original cations as determined by taking an X-ray powder diffraction pattern of the ion-exchanged material.

The hereby prepared zeolite ZSM-5 may be used in a wide variety of organic compound, e.g. hydrocarbon compounds and oxygenates such as methanol, conversion processes. Such processes include, for example, alkylation of aromatics with olefins, aromatization of normally gaseous olefins and paraffins, aromatization of normally liquid low molecular weight paraffins and olefins, isomerization of aromatics, paraffins and olefins, disproportionation of aromatics, transalkylation of aromatics, oligomerization of olefins and cracking and hydrocracking. All of the foregoing catalytic processes are of value since they result in upgrading of the organic charge being processed.

Synthetic ZSM-5 zeolites prepared in accordance hereto can be used either in the organic nitrogen-containing or alkali metal form and hydrogen form or another univalent or multivalent cationic form. They can also be used in intimate combination with a hydrogenating component such as tungsten, vanadium, molybdenum, rhenium, nickel, cobalt, chromium, manganese, or a noble metal such as platinum or palladium where a hydrogenation-dehydrogenation function is to be performed. Such components can be exchanged into the composition, impregnated therein or physically intimately admixed therewith. Such components can be impregnated in or on to ZSM-5 such as, for example, by, in the case of platinum, treating the zeolite with a platinum metal-containing ion. Thus, suitable platinum compounds for this purpose include chloroplatinic acid, platinous chloride and various compounds containing the platinum amine complex. Combinations of metals and methods for their introduction can also be used.

The aluminosilicate prepared by the instant invention is formed in a wide variety of particle sizes. Generally speaking, the particles can be in the form of a powder, a granule, or a molded product, such as extrudate having particle size sufficient to pass through a 2 mesh (Tyler) screen and be retained on a 400 mesh (Tyler) screen. In cases where the catalyst is molded, such as by extrusion, the aluminosilicate can be extruded before drying or dried or partially and then extruded.

In the case of many catalysts, it is desired to incorporate the ZSM-5 hereby prepared with another material resistant to the temperatures and other conditions employed in organic conversion processes. Such matrix materials include active and inactive materials and synthetic or naturally occurring zeolites as well as inorganic materials such as clays, silica and/or metal oxides. The latter may be either naturally occurring or in the form of gelatinous precipitates, sols or gels including mixtures of silica and metal oxides. Use of a material in conjunction with the ZSM-5, i.e. combined therewith, which is active, tends to improve the conversion and/or selectivity of the catalyst in certain organic conversion processes. Inactive materials suitably serve as diluents to control the amount of conversion in a given process so that products can be obtained economically and orderly without employing other means for controlling the rate of reaction. Frequently, zeolite materials have been incorporated into naturally occurring clays, e.g. bentonite and kaolin. These materials, i.e. clays, oxides, etc., function, in part, as binders for the catalyst. It is desirable to provide a catalyst having good crush strength, because in a petroleum refinery the catalyst is often subjected to rough handling, which tends to break the catalyst down into powder-like materials which cause problems in processing.

Naturally occurring clays which can be composited with the hereby synthesized ZSM-5 catalyst include the montmorillonite and kaolin families, which families include the sub-bentonites, and the kaolins commonly known as Dixie, McNammee, Georgia and Florida clays or others in which the main mineral constituent is halloysite, kaolinite, dickite, nacrite, or anauxite. Such clays can be used in the raw state or initially subjected to calcination, acid treatment or chemical modification.

In addition to the foregoing materials, the ZSM-5 catalyst hereby synthesized can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. The matrix can be in the form of a cogel. A mixture of these components could also be used. The relative proportions of finely divided crystalline aluminosilicate ZSM-5 and inorganic oxide gel matrix vary widely with the crystalline aluminosilicate content ranging from about 1 to about 90 percent by weight and more usually in the range of about 2 to about 50 percent by weight of the composite.

In employing the ZSM-5 catalyst of this invention for polymerization of olefin-containing liquid or gaseous charge stocks, such charge stocks can be polymerized at temperatures between 550° and 850° F. at an hourly space velocity of between 0.5 and 50 WHSV and a pressure between 0.1 and 800 psig.

In employing the catalyst of the present invention for aromatization of gaseous or liquid charge stocks which may be olefinic or paraffinic with or without aromatics present, such stocks can be aromatized at temperatures between 800° and 1200° F. and pressures from 1 to 10 atmospheres and space velocities between 0.1 and 10 WHSV.

In order to more fully illustrate the nature of the invention and the manner of practicing same, the following examples are presented.

EXAMPLES 1–44

Crystallizations were at 100° C. and 160° C. (static and stirred) and used Q-brand sodium silicate (27.8% $SiO_2$, 8.42% $Na_2O$) as a source of silica and $Al_2(SO_4)_3 \cdot 16H_2O$ as a source of alumina. Reaction mixture compositions are described by the mole ratios $SiO_2/Al_2O_3$, $H_2O/SiO_2$, $OH^-/SiO_2$, $Na/SiO_2$, and $R/SiO_2$, where R is moles of diamine, and where each mole of $Al_2O_3$ is considered to consume two moles of $OH^-$ on conversion to framework $AlO_2^-$.

Initial experiments were conducted at 100° C. Based on these results optimum compositions were selected for both static and stirred tests at 160° C., as described below.

Synthesis with 1,5-pentanediamine ($C_5DN$) at 100° C.

Crystallization experiments at 100° C. with $C_5DN$ are compiled in Table II and show that an optimum relation between $OH^-/SiO_2$ and $R/SiO_2$ exists which is dependent on $SiO_2/Al_2O_3$. At $SiO_2/Al_2O_3 = 90$, high $OH^{-\lambda}/SiO_2$ and high $R/SiO_2$ were most effective for ZSM-5 crystallization. As the $R/SiO_2$ decreased (at constant $OH^-/SiO_2$), ZSM-5 crystallization slowed down, while at very low $OH^-/SiO_2$, crystallization actually stopped. At increased aluminum content ($SiO_2/Al_2O_3 = 30$), the optimum $OH^-/SiO_2$ ratio declined (to about zero), suggesting an increasingly important role of the protonated diamine in effecting synthesis.

Thus, with $C_5DN$, an optimum $OH^-/SiO_2$ ratio was identified which decreased with decreasing $SiO_2/Al_2O_3$. At a $SiO_2/Al_2O_3$ of 90, that optimum was about 0.3; at 30, below 0.01. The higher the value of $OH^{-\lambda}/SiO_2$, the more $C_5DN$ was required.

Synthesis with 1,6-hexanediamine ($C_6DN$)

Crystallization experiments with $C_6DN$ at 100° C. are tabulated in Table III, and the importance of $OH^{-\lambda}/SiO_2$ and $R/SiO_2$ was even more pronounced. ZSM-5 crystallization was inhibited at both very high $OH^{-\lambda}/SiO_2$ and very low $OH^-/SiO_2$ values (i.e., at high $H^+(add'l)/SiO_2$) and was most facile in the region of substantial diamine protonation, namely below $OH^{-\lambda}/SiO_2 = 0.01$.

Synthesis at 160° C.

Using the optimal compositions observed at 100° C., a series of crystallizations was conducted at 160° C. in stirred and in static reaction vessels, as listed in Table IV. Pure ZSM-5 resulted.

Several products of Examples 1–44, when fully crystallized, were analyzed for sodium content. As shown in Table V, all samples were very low in sodium, less than 0.4%. Relative to aluminum, the $Na_2O/Al_2O_3$ ratio in the product ZSM-5 was below about 0.25.

TABLE V

| | Product ZSM-5 Composition* | | |
|---|---|---|---|
| Ex. | $SiO_2/Al_2O_3$ | $Na_2O/Al_2O_3$ | $R/Al_2O_3$ |
| 1 | 50.4 | 0.25 | 2.8 |
| 2 | 49.3 | 0.14 | 4.1 |
| 3 | 67.3 | 0.25 | 5.3 |
| 18 | 91.2 | 0.19 | 4.5 |
| 28 | 46.7 | 0.20 | 2.4 |
| 33 | 71.9 | 0.15 | 3.5 |
| 37 | 74.8 | 0.12 | 2.5 |

*R = diamine or organic molecule derived therefrom.

TABLE II

Crystallization Experiments at 100° C

| | Reaction Mixture Composition* | | | | | $H^+$(add'l)/ | | | | |
|---|---|---|---|---|---|---|---|---|---|---|
| Ex. | $SiO_2/Al_2O_3$ | $H_2O/SiO_2$ | $OH^-/SiO_2$ | $Na/SiO_2$ | $R/SiO_2$ | $SiO_2$ | Days | Product | Days | Product |
| 1 | 90 | 40 | 0.32 | 0.59 | 0.59 | 0.0 | 30 | 85%ZSM-5 | 53 | 90%ZSM-5 |
| 2 | 90 | 40 | 0.32 | 0.59 | 0.29 | 0.0 | 30 | 70%ZSM-5 | 53 | 80%ZSM-5 |
| 3 | 90 | 40 | <0.01 | 0.59 | 0.29 | 0.0 | 30 | amorphous | 53 | 60%ZSM-5 |
| 4 | 90 | 44 | <0.01 | 0.59 | 0.05 | 0.02 | 19 | amorphous | 150 | 20%ZSM-5 |
| 5 | 90 | 44 | <0.01 | 0.59 | 0.29 | 0.19 | 60 | 10%crystal. | 150 | 10%crystalline |
| 6 | 90 | 44 | <0.01 | 0.59 | 0.19 | 0.30 | 19 | amorphous | 180 | amorphous |
| 7 | 30 | 40 | 0.32 | 0.59 | 0.59 | 0.0 | 30 | amorphous | 53 | amorphous |
| 8 | 30 | 40 | 0.32 | 0.59 | 0.29 | 0.0 | 30 | amorphous | 53 | 30%ZSM-5 |
| 9 | 30 | 40 | <0.01 | 0.59 | 0.29 | 0.0 | 30 | 40% ZSM-5 | 53 | 60%ZSM-5 |
| 10 | 30 | 39 | <0.01 | 0.59 | 0.14 | 0.02 | 96 | 60%ZSM-5 | 180 | 65%ZSM-5 |
| 11 | 30 | 39 | <0.01 | 0.59 | 0.34 | 0.43 | 19 | amorphous | 180 | amorphous |
| 12 | 10 | 40 | <0.01 | 0.80 | 0.80 | 0.0 | 30 | 10% ZSM-5 | 53 | 30%ZSM-5 |
| 13 | 10 | 40 | <0.01 | 0.59 | 1.00 | 0.22 | 30 | 30%ZSM-5 | 53 | 30%ZSM-5 |

*R was 1,5-pentanediamine.

TABLE III

Crystallization Experiments at 100° C

| | Reaction Mixture Composition* | | | | | $H^+$(add'l)/ | | | | |
|---|---|---|---|---|---|---|---|---|---|---|
| Ex. | $SiO_2/Al_2O_3$ | $H_2O/SiO_2$ | $OH^-/SiO_2$ | $Na/SiO_2$ | $R/SiO_2$ | $SiO_2$ | Days | Product | Days | Product |
| 14 | 90 | 40 | 0.32 | 0.59 | 0.59 | 0.0 | 30 | amorphous | 53 | amorphous |
| 15 | 90 | 40 | 0.32 | 0.59 | 0.29 | 0.0 | 30 | amorphous | 53 | 55% ZSM-5 |
| 16 | 90 | 40 | <0.01 | 0.59 | 0.29 | 0.0 | 31 | 30%ZSM-5 | 53 | 70%ZSM-5 |
| 17 | 90 | 44 | <0.01 | 0.59 | 0.05 | 0.02 | 96 | 60%ZSM-5 | 180 | 60%ZSM-5 |
| 18 | 90 | 44 | <0.01 | 0.59 | 0.29 | 0.19 | 96 | 70%ZSM-5 | 154 | 100%ZSM-5 |
| 19 | 90 | 44 | <0.01 | 0.59 | 0.19 | 0.30 | 20 | amorphous | 180 | amorphous |
| 20 | 30 | 40 | 0.32 | 0.59 | 0.59 | 0.0 | 31 | amorphous | 53 | amorphous |
| 21 | 30 | 40 | 0.32 | 0.59 | 0.29 | 0.0 | 31 | amorphous | 53 | amorphous |
| 22 | 30 | 40 | <0.01 | 0.59 | 0.29 | 0.0 | 31 | 25%ZSM-5 | 53 | 40%ZSM-5 |
| 23 | 30 | 39 | <0.01 | 0.59 | 0.14 | 0.02 | 96 | 60%ZSM-5 | 180 | 60%ZSM-5 |
| 24 | 30 | 39 | <0.01 | 0.59 | 0.34 | 0.15 | 96 | 35%ZSM-5 | 180 | 60%ZSM-5 |
| 25 | 30 | 39 | <0.01 | 0.59 | 0.34 | 0.43 | 117 | amorphous | 180 | amorphous |
| 26 | 10 | 40 | <0.01 | 0.59 | 0.80 | 0.0 | 31 | amorphous | 53 | amorphous |
| 27 | 10 | 40 | <0.01 | 0.59 | 1.00 | 0.22 | 31 | 40%ZSM-5 | 53 | 40%ZSM-5 |

*R was 1,6-hexanediamine.

TABLE IV

Crystallization Experiments at 160° C

| | Reaction Mixture Composition* | | | | | | |
|---|---|---|---|---|---|---|---|
| Example | $SiO_2/Al_2O_3$ | $H_2O/SiO_2$ | $OH^{31}/SiO_2$ | $Na/SiO_2$ | $R/SiO_2$ | Days | Product |
| Stirred | | | | | | | |
| R from $C_5DN$ | | | | | | | |
| 28 | 90 | 40 | 0.32 | 0.59 | 0.59 | 3 | 100%ZSM-5 |
| 29 | 90 | 40 | 0.32 | 0.59 | 0.29 | 3 | alpha-Quartz+Analcite |
| 30 | 90 | 40 | 0.10 | 0.59 | 0.59 | 3 | alpha-Quartz |
| 31 | 30 | 40 | <0.01 | 0.59 | 0.29 | 3 | 75%ZSM-5 |
| 32 | 30 | 40 | 0.32 | 0.59 | 0.56 | 10 | alpha-Quartz+Analcite |
| R from $C_6DN$ | | | | | | | |
| 33 | 90 | 40 | <0.01 | 0.59 | 0.14 | 3 | 100%ZSM-5 |
| 34 | 90 | 40 | <0.01 | 0.59 | 0.29 | 3 | alpha-Quartz+Analcite |
| 35 | 90 | 40 | 0.10 | 0.59 | 0.59 | 3 | alpha-Quartz |
| 36 | 30 | 40 | <0.01 | 0.59 | 0.29 | 3 | 60%ZSM-5 |
| Static | | | | | | | |
| R from $C_6DN$ | | | | | | | |
| 37 | 90 | 40 | <0.01 | 0.59 | 0.14 | 3 | 98%ZSM-5 |
| 38 | 90 | 40 | <0.01 | 0.59 | 0.29 | 3 | 80%ZSM-5+alpha-Quartz |
| 39 | 90 | 40 | <0.01 | 0.59 | 0.29 | 3 | 85%ZSM-5+3%Mordenite+alpha-Quartz |
| 40 | 90 | 40 | 0.16 | 0.59 | 0.29 | 3 | 50%ZSM-5+5%Mordenite+alpha-Quartz |
| 41 | 30 | 40 | <0.01 | 0.59 | 0.59 | 3 | 60%ZSM-5 |
| 42 | 30 | 40 | <0.01 | 0.59 | 0.29 | 3 | 5% Crystalline |
| 43 | 30 | 40 | <0.01 | 0.59 | 0.14 | 3 | amorphous |
| 44 | 30 | 40 | 0.16 | 0.59 | 0.29 | 3 | 5% Crystalline |

*$H^+$(add'l)/$SiO_2$ = 0

What is claimed is:

1. A synthetic crystalline aluminosilicate zeolite having, as synthesized, a formula in terms of mole ratios of oxides in the anhydrous state as follows:

$$(0.5-10.0)R:(0-0.5)M_2O:Al_2O_3:xSiO_2$$

wherein M is an alkali metal ion, R is an alkyldiamine selected from the group consisting of pentanediamine, hexanediamine and combinations thereof or an organic nitrogen-containing cation derived from said alkyldiamine, and x is at least 5, and having the X-ray powder diffraction pattern substantially as set forth in Table I of the specification.

2. The zeolite of claim 1 wherein said alkali metal is sodium.

3. The method for preparing the crystalline aluminosilicate zeolite defined in claim 1 which comprises preparing a mixture containing sources of an alkali metal oxide, an organic nitrogen-containing oxide, an oxide of aluminum, an oxide of silicon and water and having a composition, in terms of mole ratios of oxides, within the following ranges:

$SiO_2/Al_2O_3 = 5-1000$
$H_2O/SiO_2 = 5-200$
$OH^-/SiO_2 = 10^{-10}-1.0$
$M/SiO_2 = 0.01-3.0$
$R/SiO_2 = 0.01-2.0$ wherein R is an alkyldiamine selected from the group consisting of pentanediamine, hexanediamine and combinations thereof and M is an alkali metal ion, and maintaining the mixture at a temperature of at least 100° F. until the crystals of said aluminosilicate are formed.

4. The method according to claim 3 wherein the temperature is maintained between about 100° F. and about 400° F.

5. The zeolite of claim 1 wherein R is 1,6-hexanediamine or an organic nitrogen-containing cation derived therefrom.

6. The zeolite of claim 1 wherein R is 1,5-pentanediamine or an organic nitrogen-containing cation derived therefrom.

7. The method of claim 3 wherein said composition, in terms of mole ratios of oxides, is within the following ranges:

$SiO_2/Al_2O_3 = 10-500$
$H_2O/SiO_2 = 10-100$
$OH^-/SiO_2 = 10^{-8}-0.8$
$M/SiO_2 = 0.1-2.0$
$R/SiO_2 = 0.05-1.0$

8. The method of claim 3 wherein said composition, in terms of mole ratios of oxides, is within the following ranges:

$SiO_2/Al_2O_3 = 20-100$
$H_2O/SiO_2 = 15-60$
$OH^-/SiO_2 = 10^{-6}-0.6$
$M/SiO_2 = 0.2-1.0$
$R/SiO_2 = 0.1-1.0$

9. The method for preparing the crystalline aluminosilicate zeolite defined in claim 1 which comprises preparing a mixture containing sources of an alkali metal oxide, an organic nitrogen-containing oxide, an oxide of aluminum, an oxide of silicon and water and having a composition, in terms of mole ratios of oxides, within the following ranges:

$SiO_2/Al_2O_3 = 5-1000$
$H_2O/SiO_2 = 5-200$
$OH^-/SiO_2 = 10^{-10}-1.0$
$M/SiO_2 = 0.01-3.0$
$R/SiO_2 = 0.01-2.0$ wherein R is an alkyldiamine selected from the group consisting of pentanediamine, hexanediamine and combinations thereof and M is an alkali metal ion, maintaining the mixture at a temperature of at least 100° F. until the crystals of said aluminosilicate are formed and replacing original cations thereof, at least in part, by ion exchange with a cation or mixture of cations selected from the group consisting of hydrogen and hydrogen precursors, rare earth metals, and metals from Groups IIA, IIIA, IVA, IB, IIB, IIIB, IVB, VIB and VIII of the Periodic Table of Elements.

10. The method of claim 9 wherein said replacing ion is hydrogen or a hydrogen precursor.

11. The method for preparing the crystalline aluminosilicate zeolite defined in claim 1 which comprises preparing a mixture containing sources of an alkali metal oxide, an organic nitrogen-containing oxide, an oxide of aluminum, an oxide of silicon and water and having a composition, in terms of mole ratios of oxides, within the following ranges:

$SiO_2/Al_2O_3 = 10-500$
$H_2O/SiO_2 = 10-100$
$OH^-/SiO_2 = 10^{-8}-0.8$
$M/SiO_2 = 0.1-2.0$
$R/SiO_2 = 0.05-1.0$ wherein R is an alkyldiamine selected from the group consisting of pentanediamine, hexanediamine and combinations thereof and M is an alkali metal ion, maintaining the mixture at a temperature of at least 100° F. until the crystals of said aluminosilicate are formed and replacing original cations thereof, at least in part, by ion exchange with a cation or mixture of cations selected from the group consisting of hydrogen and hydrogen precursors, rare earth metals, and metals from Groups IIA, IIIA, IVA, IB, IIB, IIIB, IVB, VIB and VIII of the Periodic Table of Elements.

12. The method for preparing the crystalline aluminosilicate zeolite defined in claim 1 which comprises preparing a mixture containing sources of an alkali metal oxide, an organic nitrogen-containing oxide, an oxide of aluminum, an oxide of silicon and water and having a composition, in terms of mole ratios of oxides, within the following ranges:

$SiO_2/Al_2O_3 = 20-100$
$H_2O/SiO_2 = 15-60$
$OH^-/SiO_2 = 10^{-6}-0.6$
$M/SiO_2 = 0.2-1.0$
$R/SiO_2 = 0.1-1.0$ wherein R is an alkyldiamine selected from the group consisting of pentanediamine, hexanediamine and combinations thereof and M is an alkali metal ion, maintaining the mixture at a temperature of at least 100° F. until the crystals of said aluminosilicate are formed and replacing original cations thereof, at least in part, by ion exchange with a cation or mixture of cations selected from the group consisting of hydrogen and hydrogen precursors, rare earth metals, and metals from Groups IIA, IIIA, IVA, IB, IIB, IIIB, IVB, VIB and VIII of the Periodic Table of Elements.

13. The method of claim 11 wherein said replacing ion is hydrogen or a hydrogen precursor.

14. The method of claim 12 wherein said replacing ion is hydrogen or a hydrogen precursor.

* * * * *

UNITED STATES PATENT AND TRADEMARK OFFICE
CERTIFICATE OF CORRECTION

PATENT NO. : 4,139,600

DATED : February 13, 1979

INVENTOR(S) : LOUIS DEANE ROLLMAN and ERNEST WILLIAM VALYOCSIK

It is certified that error appears in the above-identified patent and that said Letters Patent are hereby corrected as shown below:

Column 2, Table 1, ".2.94 $\pm$ 0.02" should be --2.94 $\pm$ 0.02--.
Column 7, Table IV, "$OH^{31}/SiO_2$" should be --$OH^-/SiO_2$--.
Column 9, Claim 7, "$OH^-/SiO_2 = 10^{-8}14\ 0.8$" should be --$OH^-/SiO_2 = 10^{-8}-0.8$--.

Signed and Sealed this

Ninth Day of October 1979

[SEAL]

Attest:

RUTH C. MASON
Attesting Officer

LUTRELLE F. PARKER
Acting Commissioner of Patents and Trademarks